United States Patent [19]

Ebersohl et al.

[11] Patent Number: 5,384,678
[45] Date of Patent: Jan. 24, 1995

[54] CONTROL AND SELF-MONITORING SYSTEM, IN PARTICULAR FOR A MULTIPOLE ELECTRICAL APPARATUS SUCH AS A HIGH TENSION CIRCUIT BREAKER

[75] Inventors: Gérard Ebersohl, La Mulatiere; Edmond Thuries, Meyzieu, both of France

[73] Assignee: Gec Alsthom T & D SA, Paris, France

[21] Appl. No.: 73,045

[22] Filed: Jun. 8, 1993

[30] Foreign Application Priority Data

Jun. 9, 1992 [FR] France .............................. 92 06920

[51] Int. Cl.[6] .............................................. H02H 3/00
[52] U.S. Cl. ........................................ 361/62; 361/64; 361/66; 361/97
[58] Field of Search ................. 361/93, 62, 64, 66, 361/81, 115, 97

[56] References Cited

U.S. PATENT DOCUMENTS

| | | | |
|---|---|---|---|
| 4,672,501 | 6/1987 | Dilac et al. | 361/97 |
| 4,937,757 | 6/1990 | Dougherty | 361/97 |

FOREIGN PATENT DOCUMENTS

| | | | |
|---|---|---|---|
| 0166206 | 1/1986 | European Pat. Off. | H02H 11/00 |
| 0338185 | 10/1989 | European Pat. Off. | H01H 33/56 |
| 0342597 | 11/1989 | European Pat. Off. | G01R 31/28 |
| WO8912345 | 12/1989 | WIPO | H02H 13/00 |

OTHER PUBLICATIONS

Patent Abstracts of Japan, vol. 13, No. 476 (E-837)(3824) Oct. 27, 1989 & JP-A-11 87 721 (Mitsubishi) Jul. 27, 1989.

Primary Examiner—Marc S. Hoff
Assistant Examiner—S. Jackson
Attorney, Agent, or Firm—Sughrue, Mion, Zinn, Macpeak & Seas

[57] ABSTRACT

Control and self-monitoring system for an electrical apparatus comprising three poles, each including a closing coil and an opening coil, an opened auxiliary contact, and a closed auxiliary contact, wherein each of the poles is provided with a microprocessor receiving, in particular, information from the opened auxiliary contacts and controlling two static relays in series respectively with the circuit of the opening coil and in the circuit of the closing coil, the microprocessors being subscribers to a local bus comprising a serial bus under the control of a management member and connected to a processor station receiving the signals collected by the microprocessors and the signals issued by the protection devices or by the operator.

8 Claims, 4 Drawing Sheets

CONTROL AND SELF-MONITORING SYSTEM, IN PARTICULAR FOR A MULTIPOLE ELECTRICAL APPARATUS SUCH AS A HIGH TENSION CIRCUIT BREAKER

The present invention relates to a control and self-monitoring system for a multipole electrical apparatus. The system is described below as applied to a high tension three-phase circuit breaker, but it should be understood that the same system could be applied, mutatis mutandis, to any multipole electrical apparatus, e.g. to a three-phase section switch.

BACKGROUND OF THE INVENTION

A high tension three-phase circuit breaker includes three poles (referred to below as "pole 1", "pole 2", and "pole 3") which may be operated separately or simultaneously. Insulation is provided in modern high tension circuit breakers by a gas having high dielectric power; a preferred choice is sulfur hexafluoride ($SF_6$) at a pressure of a few hectopascals, either pure or mixed with nitrogen. The pressure of the insulating gas within the pole enclosures is an important factor which needs to be taken into consideration when a circuit breaker is to be driven, since it would be dangerous to open a pole if subsequent insulation between its contacts could not be guaranteed, due to a lack of pressure. For convenience, this factor is referred to below as "$SF_6$ pressure" and, if necessary, it may be specified as "pole 1 $SF_6$ pressure" or "pole 2 $SF_6$ pressure" or "pole 3 $SF_6$ pressure".

Each of the poles of a circuit breaker is controlled via a closing coil and an opening coil. The opening coil is powered via a contact of a protection relay; the closing coil is powered via a contact of a reclosing circuit. In a variant, the opening and closing coils may be subjected to manual orders given either locally or remotely.

Each pole of a circuit breaker is provided with a device for detecting the position of its moving equipment:

a first device known as an "opened auxiliary contact" (referred to below by the initials CAO), provides an electrical signal indicating that the moving equipment has moved from a closed position of the pole to an open position; and a second device, known as a "closed auxiliary contact" (referred to below by the initials CAF), provides a signal indicating that the moving equipment has moved from an open position of the pole to a closed position.

These auxiliary contacts are preferably of the type described in French patent application No. 91 04 631, of Apr. 16, 1991.

In the above-outlined context of a three pole circuit breaker, the object of the present invention is to provide a control and self-monitoring system for the circuit breaker constituting a basic operating level of an electricity station, also referred to as level zero "0".

OBJECTS AND SUMMARY OF THE INVENTION

An object of the invention is to provide a system that is reliable and is thus unaffected by disturbances that exist in a station, which disturbances may be climatic (cold, bad weather) or electromagnetic (disturbances induced by the presence of and the operation of surrounding equipment).

Another object of the invention is to provide a system that is cheap, and in which wiring is kept to a minimum.

Another object of the invention is to provide a system enabling the configuration of the electrical apparatus and its monitoring and control system to be tested in the factory.

The present invention provides a control and self-monitoring system for a multipole electrical apparatus such as a three-phase circuit breaker forming a portion of a station for transporting, interconnecting, or distributing electricity under the direction of an operator, and comprising three poles each having a closing coil and an opening coil connected to a voltage source, each pole including an opened auxiliary contact and a closed auxiliary contact, the circuit breaker being controlled by protection devices, wherein each of the poles is provided with a microprocessor receiving, in particular, information from the opened and closed auxiliary contacts, the microprocessor controlling two static relays respectively in series with the opening coil circuit and with the closing coil circuit, the microprocessor of the there poles being subscribers to a local network comprising a serial bus under the control of a management member, the bus being connected to a processor station receiving the signals collected by the microprocessors and the signals emitted by the protection devices or by the operator, said signals being periodically updated in application of a program provided to said management member, said processor member using said bus to collect the data provided by each of said microprocessors and issuing orders for authorizing or prohibiting opening which are transmitted over said bus to said microprocessors, said microprocessors controlling the change of state of said static switches to perform circuit breaker opening or closing orders.

In a first embodiment of the invention, the opening coils and the closing coils are respectively in series with the contacts of a protection member, and with the contacts of a reclosing circuit, the static switches being normally closed and being opened only on orders from the microprocessor, at the end of executing the corresponding opening or closing order.

In a second embodiment, the opening and closing orders are transmitted to the processor member which forwards them to the microprocessors, said static switches being normally opened and being closed only on orders from the microprocessors, and for the length of time required for enabling an opening or closing order to be performed.

Advantageously, the bus possesses a plurality of subscribers constituted by checking members e.g. for checking the pressure of insulating gas, for checking electrical wear by summing $\Sigma i^2 t$, or for performing other checks or measurements relating to the environment of the circuit breaker, e.g. measuring oil pressure in hydraulic controls of the circuit breaker or analyzing vibration signatures.

Preferably, in that each coil permanently conveys a low value current generated by a circuit constituted by the coil itself, a resistor and the static switch associated with the coil, said circuit being powered from a voltage source, with the image of said current being transmitted to the microprocessor to provide a self-diagnosis signal concerning the coil and control thereof.

Advantageously, the static switches are connected to the micro-processors via optical fiber links.

BRIEF DESCRIPTION OF THE DRAWINGS

The invention is now explained in detail with reference to the accompanying drawings, in which.

MORE DETAILED DESCRIPTION

Figure 1:
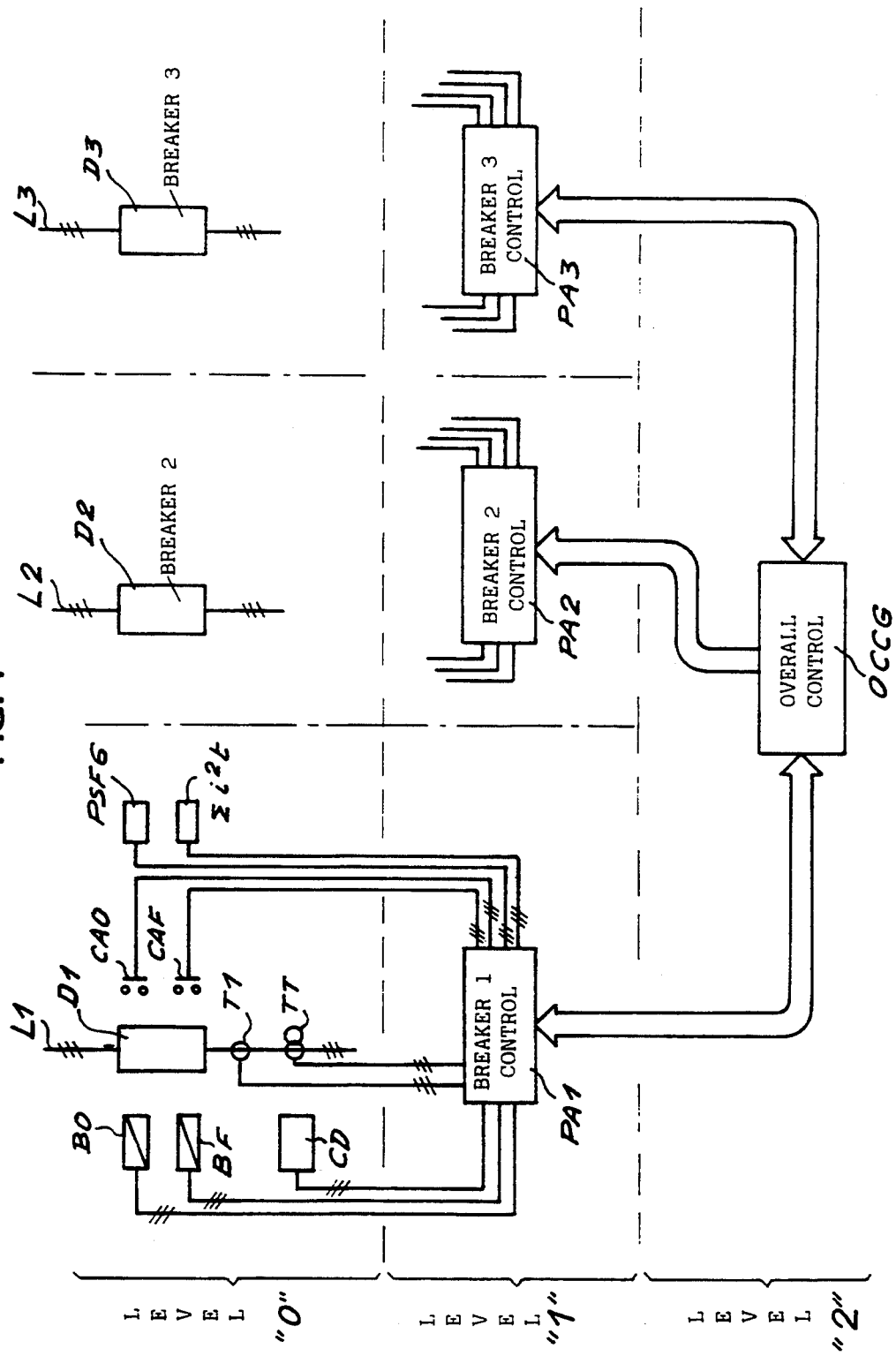
FIG. 1 is a diagram showing a conventional type of functional organization for operating an electricity station that comprises a plurality of three-phase circuit breakers.

FIG. 1 which shows the prior art is a fragmentary one-wire diagram showing the functional organization of an electricity station comprising three outlets referenced L1, L2, and L3, which are respectively protected by three-phase circuit breakers D1, D2, and D3. Naturally this number three is given purely by way of example, the station could have more outlets.

In the hierarchy of members for checking, monitoring and controlling the circuit breaker, three functional levels are distinguished:

level "0" comprises measurement, check, and control members specific to the circuit breakers, and is described below;

level "1" comprises for each three-phase circuit breaker, a member for generating circuit breaker drive signals on the basis of the data available at level 0 and on instructions from and under the supervision of level 2, this member is referenced PA1 for circuit breaker D1, PA2 for circuit breaker D2, and PA3 for circuit breaker D3; and level "2" which is the level from which the electricity station is controlled, where the outlets to be used are selected as a function of operating constraints and of availability, and this level includes a central control and management member OCCG.

In the description below, reference is made only to elements associated with circuit breaker D1, it being understood that circuit breakers D2 and D3 are equipped in the same way.

The three-phase circuit breaker includes members which are common to all three poles, e.g. a member CD for checking control signals and providing signals on the aptitude of the control signal to perform an order.

Each pole of the three-phase circuit breaker includes, in particular, an opening control coil BO, a closing control coil BF, an opened auxiliary contact CAO providing a signal indicating that the pole has performed a transition from the closed state to the open state, a closed auxiliary contact CAF providing a signal indicating that the pole has performed a transition from the open state to the closed state, a member $PSF_6$ indicating the pressure of the gas inside the pole, and a member for measuring electrical wear, based on counting $\Sigma i^2 t$, and referenced $\Sigma i^2 t$.

All of the above members are connected via cable links to the member PA1.

The number of cables to be installed is very large and as a result:

cost is high because of the large amount of time required for manual operations;

the risks of wiring errors which are expensive to detect and repair on site;

the risks of breakdowns (cables being broken, terminals coming off, screws being loosened, etc . . . ); and the risks of wrong operation due to electromagnetic disturbances induced in the cables by the presence of high tension lines and other apparatuses operating in the vicinity.

As explained below, all of the above drawbacks are avoided by the invention.

The invention relates to level "0" of the functional organization at a station.

Figure 2:
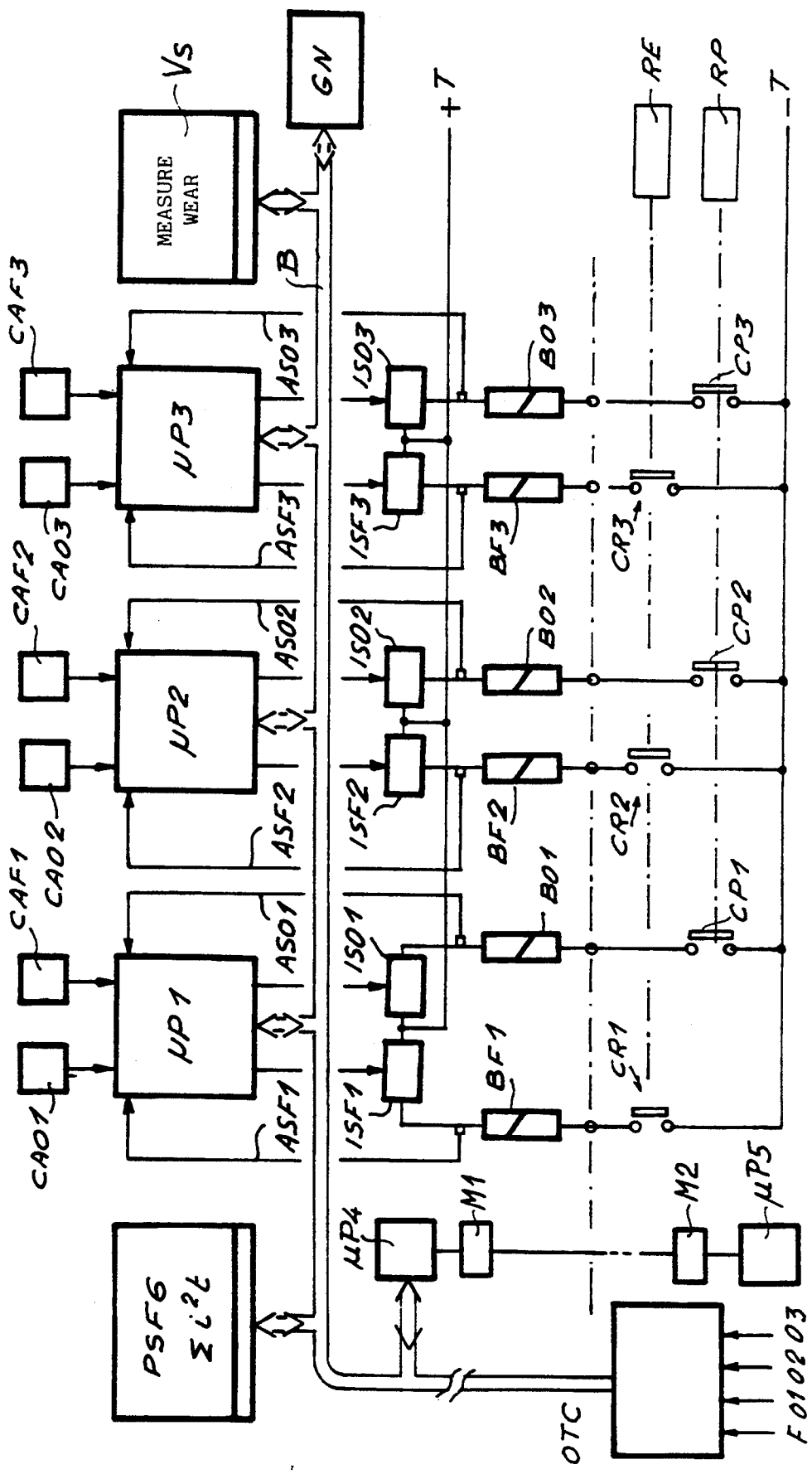
FIG. 2 is a diagram of the monitoring system for a circuit breaker constituting a first embodiment of the invention.

In the first embodiment of the invention, as shown in FIG. 2, it can be seen that according to a fundamental characteristic of the invention each pole of a circuit breaker is fitted with a respective microprocessor; the microprocessors relating to the three poles of the circuit breakers are given respective references $\mu P1$, $\mu P2$, and $\mu P3$.

According to another characteristic of the invention, the microprocessors are all subscribers to a serial bus B under the control of a member GN referred to as a "nomenclature" manager or as a "request" manager.

According to another characteristic of the invention, the member $PSF_6$ for measuring pole pressure and the member $\Sigma i^2 t$ for measuring electrical wear of the poles are also subscribers to the bus B. In .FIG. 2, these members are represented by a single rectangle labelled $PSF_6$, $\Sigma i^2 t$.

In FIG. 2, the rectangles BO1, BO2, and BO3 represent the respective opening coils of the poles 1, 2, and 3 of the three-phase circuit breaker. These coils are powered by a voltage $-T +T$, in particular via contacts CP1, CP2, and CP3 of a protection relay RP.

Rectangles BF1, BF2, and BF3 represent respective closing coils for the three poles of the circuit breaker; they are powered from the same voltage source $-T +T$, in particular via contacts CR1, CR2, and CR3 of a reclosing circuit RE.

The relays and the reclosing circuits belong to operating level 1, which is symbolically marked off in FIG. 2 by dot-dashed line D.

According to a fundamental characteristic of the invention, static switches are placed in series in the circuits of the coils, and the opened or closed state of the switches is under the control of the microprocessors; for pole 1, coil BF1 is in series with static switch ISF1 under the control of microprocessor $\mu P1$ and coil BO1 is in series with static switch ISO1, likewise under the control of microprocessor $\mu P1$. For the other poles, the static switches are designated by analogous notation with final digits 2 and 3 for poles 2 and 3 respectively.

According to the invention, the microprocessor receives the signals provided by the auxiliary contacts; thus, microprocessor $\mu P1$ receives the signal from opened auxiliary contact CAO1 and the signal from closed auxiliary contact CAF1; the other microprocessors receive signals from the corresponding auxiliary contacts.

The coils may be provided with respective self-monitoring members whose signals are transmitted to the corresponding microprocessors; thus, microprocessor $\mu P1$ receives the self-monitoring signals from coils BF1 and BO1 via links ASF1 and ASO1, respectively. The other microprocessors receive analogous signals from the coils of the poles to which they are allocated.

The set of signals collected by the microprocessors constitutes a data base which is periodically refreshed under authorization of the request manager GN and sent to a central processor member OTC which is preferably physically located at operating level 1 with which it also serves as the interface. This is made possible by using an optical bus which may be several hundreds of meters long and which is unaffected by climatic disturbances or electromagnetic disturbances.

Simultaneously with the relays CP1 and CR1 associated with protection and with reclosing, the circuit OTC receives the respective corresponding opening and closing orders as symbolized in the figure by references 01, 02, and 03 for opening and F for closing. It may be observed that there are three opening orders since it is possible for a single pole to receive an order to open on a phase-ground fault, whereas there is only one reclosing order since there is no harm in applying the reclosing order unnecessarily to poles that are already closed.

Before describing the operation of the system, it should be observed that the central processor member OTC stores any discordances that may arise in the operation of the circuit breaker. To understand the notion of "discordance", consider the following example: assume that the circuit breaker is open and that a closing order is issued. When OTC receives the order, it starts a time window $t_o$, e.g. of 200 milliseconds duration; OTC observes the state of the poles at the end of this time delay; if one of the poles has not closed, OTC stores a discordance and issues an opening order by closing a contact in parallel with CR2 (not shown) and after previously removing the closing order from the database.

Another procedure exists when the circuit breaker is closed and an opening order is issued. Under such circumstances, it suffices merely to indicate that an anomaly has occurred.

The operation of the system is now described. The circuit OTC continuously receives the data collected by the microprocessors and by the circuits $PSF_6$ $\Sigma i^2 t$. This data is refreshed e.g. once every 2.5 milliseconds when it is priority data (CAO, CAF), and once every 20 milliseconds when it is non-priority data (e.g. $PSF_6$). OTC continuously analyses this data.

Circuit Breaker Opening

Assume that the circuit breaker is closed. OTC has detected no anomalies. The microprocessors hold their static opening switches ISO closed. If an opening order arises by the contacts CP closing, then the circuit breaker opens immediately, by powering the coils BO. The microprocessors switch off the coils BO by opening the relays IS as soon as the auxiliary contacts CAO have indicated that opening has indeed taken place.

Closing the Circuit Breaker

Operation is analogous. The microprocessors hold the static relays ISF closed if OTC does not detect any anomaly that could result either from the positions of the poles (known from the auxiliary contact signals transmitted by the microprocessors), or else from the configuration of the station (as indicated by level 2).

When a circuit breaker closing order is given, as manifested by the contacts CR of the reclosing circuit closing, the coils BF are powered, thereby causing the poles to close. The microprocessors switch off the power supply to the coils by opening the static contacts ISF as soon as the auxiliary contacts CAF have indicated that the closure operation has been properly performed.

Figure 3:
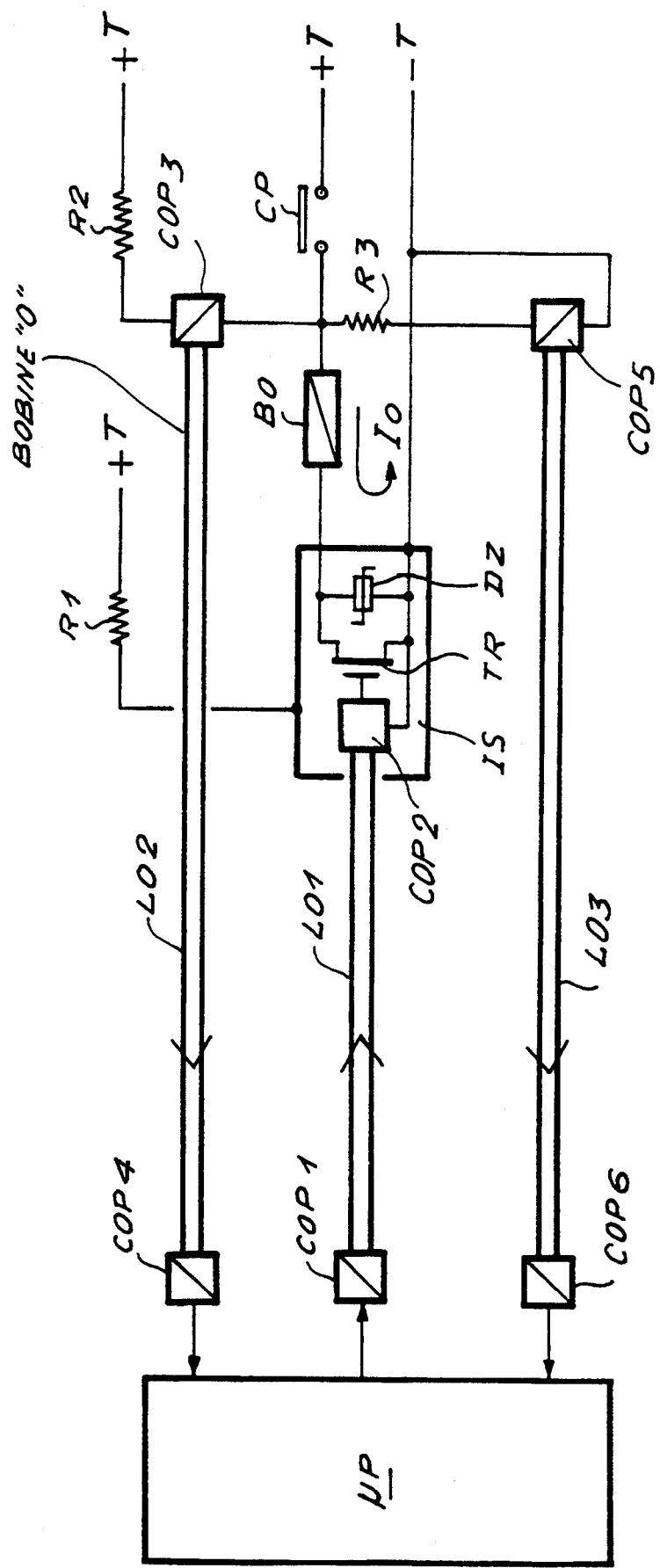
FIG. 3 is a diagram for explaining the power supply and the self-monitoring of an opening coil and of its control.

FIG. 3 shows one way in which power can be supplied to an opening coil BO. Assume that the circuit breaker is closed. Under such circumstances, the static switch associated with the coil BO is normally closed, and contact CP is normally open.

In the figure, reference BO designates an opening coil powered by a voltage $-T +T$. The coil is in series with a contact CP of a protection relay and with a static relay IS. The static relay is controlled by the microprocessor $\mu P$ via an optical fiber link LO1 which is provided at both ends with respective opto-electronic converters COP1 and COP2. The static switch is biased by the same voltage source $-T +T$ by means of a resistor R1. The static relay is represented merely by a zener diode DZ and by a transistor TR controlled by the signal issued by the microprocessor over the line LO1. The coil BO continuously carries a current IO of 30 mA, for example, since it is permanently connected to the terminal $+T$ of the voltage source via a resistor R2. This current flows through the resistor R2, the coil BO, and the static switch IS when the static switch is closed. This current serves to provide the microprocessor with a signal showing that the coil is in good condition, as is the associated static switch: the microcontroller therefore knows that the next opening control signal can be performed reliably as soon as the protection contact CP closes. This is obtained by means of an optoelectronic converter COP3 which is inserted in the coil circuit and which transmits its information by means of an optical fiber LO2 whose end adjacent to the microprocessor is provided with an optoelectronic converter COP4.

A pole opening order as manifested by closing of the contact CP in the protection relay is transmitted to the microprocessor $\mu p$ by means of a circuit including a resistor R3 connected downstream from the terminal $+T$ and in series with an optoelectronic converter COP5 which is connected to the terminal $-T$. The information picked up by the converter COP5 is transmitted to the micro-processor over an optical fiber link LO3 whose end in the vicinity of the microprocessor is provided with an opto-electronic converter COP6.

In addition to executing opening and closing orders, the microprocessor collects and transmit to OTC information relating to the time taken by the poles to open or close. This data, transmitted from OTC to operating level 2 can be used to organize predictive maintenance of the apparatus.

The advantages of the system as described above with respect to the first embodiment are considerable:

a large amount of expensive cabling is eliminated, thus greatly reducing the labor costs associated with the installation; this elimination of cabling takes place in particular between the microprocessors at level "0" and to an even greater extent between level "0" and level "1" because of the serial bus that makes it possible to locate the microprocessor OTC elsewhere;

the installation can be tested in the factory using simulators, for example, and it can be installed very quickly on site since there remain only a few connectors to be coupled (connection between level "0" and level "1") thus providing further savings;

maintenance costs are reduced since the probability of breakdown is much smaller due to the disappearance of the cabling and to the permanent self-monitoring of the serial communications bus replacing the cabling;

operation is more reliable because of the insensitivity of the system to electromagnetic disturbances that occur frequently in high tension stations; transmission takes place over an optical bus and metal portions are short so they can be screened effectively at low cost;

the system at level "0" is opened up because of the bus which makes it possible to oversee a distributed database: no additional cabling is required to add a microprocessor that can monitor such or such a parameter indicative of proper operation of the circuit breaker (e.g. by performing signal analysis on mechanical vibrations, etc), with this being made possible by the serial bus; and all or some of the self-diagnosis information can be conveyed to (operator) level "2" from the level "0" database without additional cabling, particularly if the elements at level "1" are themselves in communication via a local network.

Figure 4:
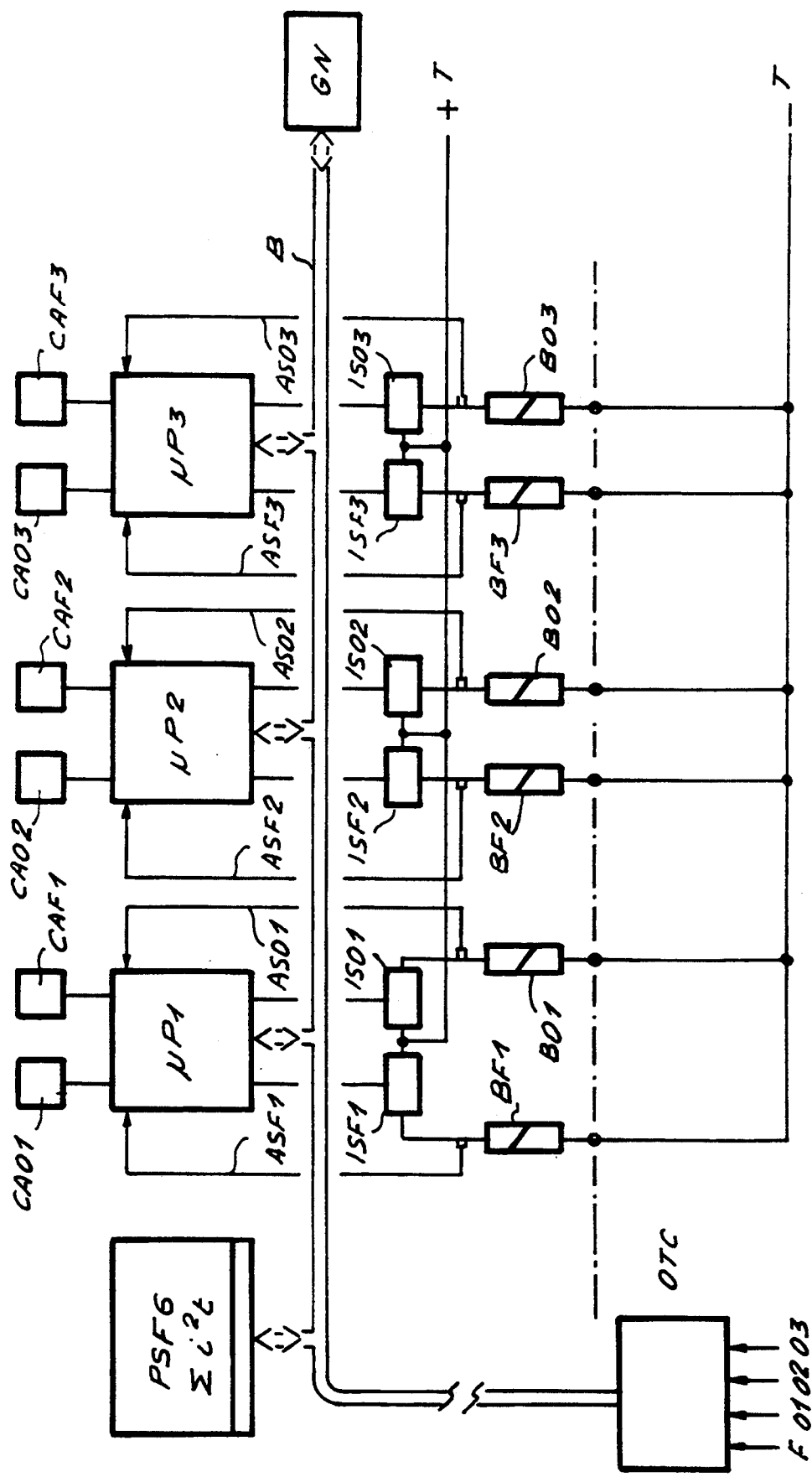
FIG. 4 is a diagram of a system constituting another embodiment of the invention.

FIG. 4 shows a more elaborate embodiment of the invention.

Elements in common with FIGS. 2 and 3 are given the same reference numerals.

In FIG. 4, the relays and the reclosing circuits are eliminated. Opening and closing orders (O1, O2, O3, F) generated at operating level 1 are transmitted via OTC to the microprocessors which control the static switches directly. While waiting for an opening or closing order, the static switches are normally open.

The system of the invention is an open system in the sense that the bus B can receive subscribers other than the microprocessors. In addition to the members already mentioned for monitoring pressure (PSF$_6$) and electrical wear ($\Sigma i^2 t$), the bus can receive other data such as data relating to oil pressure in the hydraulic control means or for analyzing a vibration signature.

In particular, the bus may include a "wear" station (Vs in FIG. 2) which, for example, receives from the other stations information relating to the instants at which an opening control signal is given and a closing control signal is given for each pole and to the instants at which the corresponding auxiliary opening and closing contacts of each pole operate. The program in this station then calculates the operating speeds of each pole and compares them with reference values, for the purpose of giving alarms where appropriate.

The bus may also include a station referenced $\mu$P4 in FIG. 2 which constitutes a sink for all of the data and which may itself be used as a data source. It may be constituted, for example, by a microcomputer connected via a modem M1 to a telephone line whose other end is connected via a modem M2 to a microcomputer $\mu$P5. The circuit breaker may thus be controlled remotely.

We claim:

1. A control and self-monitoring system for a multipole electrical apparatus such as a three-phase circuit breaker forming a portion of a station for transporting, interconnecting, or distributing electricity under the direction of an operator, and comprising three poles each having a closing coil and an opening coil connected to a voltage source, each pole including an opened auxiliary contact and a closed auxiliary contact, the circuit breaker being controlled by protection devices, wherein each of the poles is provided with a microprocessor receiving, in particular, information from the opened and closed auxiliary contacts, the microprocessor controlling two static relays respectively in series with the opening coil circuit and with the closing coil circuit, the microprocessor of the there poles being subscribers to a local network comprising a serial bus under the control of a management member, the bus being connected to a processor station receiving the signals collected by the microprocessors and the signals emitted by the protection devices or by the operator, said signals being periodically updated in application of a program provided to said management member, said processor member using said bus to collect the data provided by each of said microprocessors and issuing orders for authorizing or prohibiting opening which are transmitted over said bus to said microprocessors, said microprocessors controlling the change of state of said static switches to perform circuit breaker opening or closing orders.

2. A system according to claim 1, wherein the opening coils and the closing coils are respectively in series with the contacts of a protection member, and with the contacts of a reclosing circuit, the static switches being normally closed and being opened only on orders from the microprocessor, at the end of executing the corresponding opening or closing order.

3. A system according to claim 1, wherein the opening and closing orders are transmitted to the processor member which forwards them to the microprocessors, said static switches being normally opened and being closed only on orders from the microprocessors, and for the length of time required for enabling an opening or closing order to be performed.

4. A system according to claim 1, wherein the bus possesses a plurality of subscribers constituted by checking members e.g. for checking the pressure of insulating gas, for checking electrical wear by summing $\Sigma i^2 t$, or for performing other checks or measurements relating to the environment of the circuit breaker, e.g., measuring oil pressure in hydraulic controls of the circuit breaker or analyzing vibration signatures.

5. A system according to claim 1, wherein each coil permanently conveys a low value current generated by a circuit constituted by the coil itself, a resistor and the static switch associated with the coil, said circuit being powered from a voltage source, with the image of said current being transmitted to the microprocessor to provide a self-diagnosis signal concerning the coil and control thereof.

6. A system according to claim 1, wherein the static switches are connected to the micro-processors via optical fiber links.

7. A system according to claim 1, wherein said bus includes a subscriber receiving, in particular, data relating to the instants at which opening and closing orders are given, and to the instants at which the auxiliary contacts change state, serving to calculate the execution time of said orders, comparing such times with recorded data, and providing information on the state of wear of the poles.

8. A system according to claim 1, wherein the bus includes a station which receives all of the data and which is capable of emitting data, said station being connected by a modem to a telephone line which is in turn connected by a modem to a microcomputer, thereby enabling the apparatus to be remotely controlled.

* * * * *